United States Patent [19]

Greco

[11] 4,308,895
[45] Jan. 5, 1982

[54] FLAME BONDED HOSE

[75] Inventor: John R. Greco, Ravenna, Ohio

[73] Assignee: Parker-Hannifin Corporation, Cleveland, Ohio

[21] Appl. No.: 115,167

[22] Filed: Jan. 25, 1980

[51] Int. Cl.³ ............................................. F16L 11/08
[52] U.S. Cl. ................................... 138/125; 138/132; 138/174
[58] Field of Search ............... 138/124, 125, 126, 127, 138/129, 130, 132, 137, 172, 174; 156/149, 187

[56] References Cited

U.S. PATENT DOCUMENTS

| | | | |
|---|---|---|---|
| 2,977,839 | 4/1961 | Kock | 138/125 X |
| 3,479,670 | 11/1969 | Medell | 138/125 X |
| 3,633,629 | 1/1972 | Rider | 138/127 |
| 4,007,070 | 2/1977 | Busdiecker | 138/125 X |

Primary Examiner—James E. Bryant, III
Attorney, Agent, or Firm—Joseph B. Balazs

[57] ABSTRACT

A thermoplastic hose construction and method of making same wherein a thermal bond is achieved directly between the reinforcement and cover without the necessity for intermediate bonding materials. An open flame played upon a reinforced core tube, wherein the reinforcement consists of yarn windings at least one of which is partly formed of continuous filaments of olefinic material compatible with an olefinic based cover, softens the compatible strands just prior to extrusion of the cover thereover to provide a distributed bond of discontinuous contact areas between the reinforcement and cover. In a preferred embodiment of the invention polypropylene is used as one yarn in the reinforcement for bonding with a thermoplastic rubber cover.

5 Claims, 5 Drawing Figures

FLAME BONDED HOSE

BACKGROUND OF THE INVENTION

Hoses formed of synthetic plastic materials have become commonplace due to advantages in being relatively lightweight, having a wide range of selectable characteristics and being relatively easy to manufacture. One of the difficulties encountered, however, in some of these hose constructions is the incompatibility between materials, selected, for example, for strength in reinforcement purposes and for inertness in providing a jacket or cover for the hose which has a high resistance to external influences. A bond between the cover of the hose and the reinforcement may be desired in order to integrate the hose structure, to improve its kink resistance and its coupling capability and even to improve the external appearance of same. This latter factor is of significance, since with the relatively thin covers which often are employed in these hose constructions, a certain degree of sagging of the cover occurs on bending or flexure of the hose unless a secured arrangement is provided.

In the past it has been typical to secure a bond between the reinforcement and cover by the introduction of a solvent, adhesive or other bonding agent, either to act upon the surface of the reinforcement or the cover to achieve a chemical fusion therebetween. One example of such method is disclosed in U.S. Pat. No. 4,007,070. However, it will be apparent that such method introduces additional steps in the manufacturing process and produces at the very least a localized chemical effect upon the hose structure which may be detrimental to various of the components thereof.

A better method for achieving a bond between reinforcement and cover is disclosed in U.S. Pat. No. 3,633,629 wherein it is taught that a material can be introduced into the reinforcement as one of the components thereof which is compatible in chemical characteristics with the cover so that a fusion bond may be effected therebetween. In this method the compatible thermoplastic material is introduced as one of the yarns forming the braid wrapped under tension onto the core of the structure which is then passed through a suitable pre-heater for raising the temperature thereof just prior to the extrusion of a cover of compatible material thereover. The instant invention is an improvement on such teaching wherein a more desirable hose construction is obtained and a preferred method of construction is provided.

SUMMARY OF THE INVENTION

The present invention provides an improved hose construction and method for forming same wherein a superior arrangement of fusion bond between portions of a braided reinforcement and a compatible outer hose cover is effected which improves the retention of the cover and the aesthetic appearance of same. In the method of construction, an open flame is directed upon the reinforcement materials in a manner tending to selectively heat the compatible reinforcement material to the melting temperature while minimizing the effect upon the remainder of the hose construction.

In the preferred embodiment of this invention the hose consists of a thermoplastic core tube, reinforcement layer and outer cover wherein at least one of the yarns forming the reinforcement braid consists of a bundle of yarns having continuous filaments of olefin-based material which is compatible with the olefin-based structure of the outer cover.

DETAILED DESCRIPTION OF THE INVENTION

Figure 3:
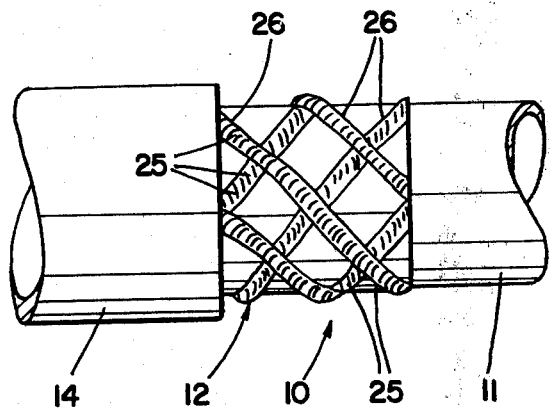
FIG. 3 is a partial elevational view of a preferred embodiment of hose according to the teachings of this invention.
Figure 5:
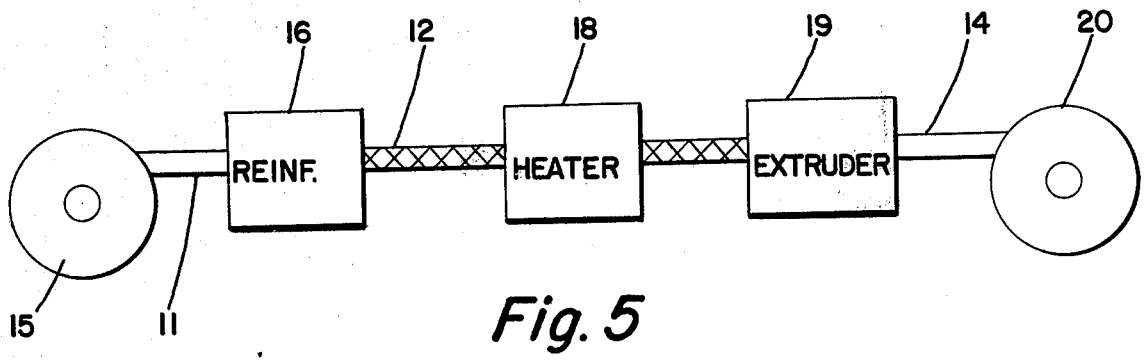
FIG. 5 is a schematic drawing illustrating the method for making the hose of FIG. 3.

Referring initially to FIG. 3 the hose 10 comprises a core tube 11, a braided yarn reinforcement layer 12 and an outer cover 14. The method of constructing the hose 10 by the method of the present invention is illustrated in FIG. 5 wherein core tube 11 is obtained from a conventional extruder in a manner well-understood in the art. The core tube 11 may be preformed and delivered from a storage reel 15 as shown in FIG. 5. The core tube 11 is then passed through a reinforcement stage 16 wherein reinforcement yarns 12 are wound over the core tube in any of many different configurations including, for example, spiral wraps, braided coverings, knitted arrangements and the like. During the application of reinforcement yarns 12 a preferred arrangement of a particular material comprising a part of the reinforcement yarn 12 is obtained by the manner of lay of the reinforcement as well as by the structure of the reinforcement yarn, to be described in more detail hereinafter. The reinforced structure is then passed through a heater unit depicted schematically at 18 in FIG. 5 and immediately thereafter passed through an extruder 19, wherein the outer cover 14 is applied over the reinforcement yarns 12 and the completed hose structure eventually wound upon storage reel 20.

Figure 1:
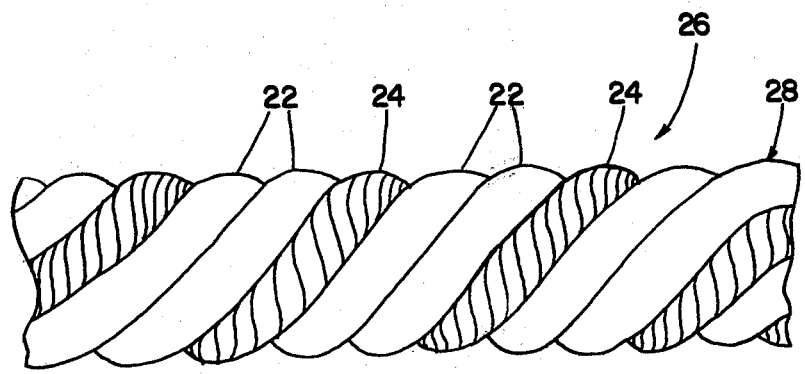
FIG. 1 is a partial elevational view of one of the reinforcement yarns showing a bundle of three twisted yarns.

Referring now more particularly to FIG. 1, one of the strands forming the reinforcement 12 for the hose 10 is shown in enlarged detail as comprising first and second yarns 22, 24 which are twisted together in a spiral manner to form a twisted bundle of yarn referred to generally at 26. In this embodiment of the invention two separate first yarns 22 and a single second yarn 24 are combined to form the bundle 26, the yarns being axially twisted in a conventional manner to provide a typical undulating edge 28 forming the profile of the yarn bundle 26. Second yarn 24 is the bonding yarn and is an olefin-based yarn such as polypropylene or polyethylene or it may be a polyester such as Dacron, and is selected for compatibility with the material forming the outer cover 14. In this embodiment of the invention outer cover 14 preferably is a thermoplastic rubber material, this being an olefin-based material which also may be softened by the application of heat thereto for fusion purposes. The remaining yarns 22 in the yarn bundle 26 may be any material selected primarily for reinforcement purposes to add strength to the hose structure 10 and which would be compatible in the environment of the hose processing line. In this regard the reinforcement yarns 22 may be nylon, polyester, kevlar, wire or the like. Although the outer cover 14 is preferably an olefin-based TPR, it may as well be polyethylene or any other polyolefin which is characterized in being relatively inert and having extremely good resistance to external influences and yet providing a desired softening characteristic at elevated temperatures suitable for bonding purposes. The outer cover 14 could as well be Hytrel or other compatible polyester material if a polyester such as Dacron is used as the reinforcement and different temperatures of fusion are employed.

As may be seen more clearly in FIG. 3 when the twisted bundle 26 is applied as one of the reinforcement yarns 12 in the reinforcement structure of the hose, the bonding yarn 24 is interspersed throughout the structure in various patterns dependent upon the number of strands of reinforcement yarns 22 employed versus the number of strands of bonding yarn 24, the number of yarns in the reinforcement 12 and whether or not the reinforcement is wound, braided or knitted in closed or open-weave patterns. In any event the bonding material 24 occurs at the outer periphery of the reinforcement structure 12 as a plurality of relatively evenly distributed discontinuous contact areas 25 generally tangential to the substantially cylindrical inner surface of the outer cover 14. This distribution pattern provides a preferred contact arrangement between the reinforcement 12 and the outer cover 14 which when fusion is effected, provides a preferred bonded arrangement for the cover 14. In this arrangement the cover is secured to the reinforcement at a multiplicity of small contact areas and may be bent and stretched with other portions of the hose without sagging or rippling and without undergoing undue stretching which could result in a baggy appearance for the cover. With high-quality hose materials available for the outer cover 14 a relatively impervious and aesthetic structure can be achieved in a relatively thin cover 14 which would otherwise be particularly susceptible to the detrimental appearance characteristics described. While these conditions are not necessarily detrimental to the operating characteristics of the hose structure they are aesthetically not appealing and considered undesirable. Still further, and because of the interlock between the reinforcement 12 and the outer cover 14 a certain amount of stength is added to the hose construction and it is determined that a good degree of kink resistance is achieved in this embodiment of the invention.

Figure 2:
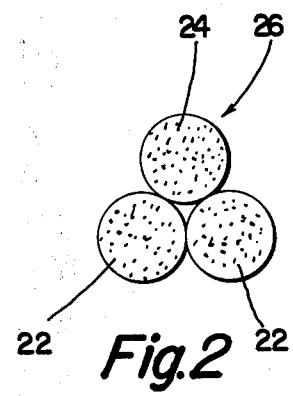
FIG. 2 is an end view of the yarn bundle depicted in FIG. 1.

Referring again to the enlarged showings of the twisted yarn bundle 26 in FIGS. 1 and 2, it may be seen that each of the reinforcement yarns 22 is comprised of a plurality of individual yarn fibers which have been combined by conventional textile techniques to provide individual yarns 22 for further combination purposes. Similarly, bonding yarn 24 comprises a plurality of individual strands, preferably of continuous filaments of polypropylene, extending substantially the full length of the yarn 24. It should be clear that the yarn bundle 26 may comprise any number of twisted yarns 22, 24 therein and any percentage less than all of the yarns may be the bonding yarns 24, it being desirable to provide sufficient material to achieve the desired degree of bonding with the outer cover 14 and yet providing the necessary strength in the reinforcement layer 12. It is desired that relatively few yarns 22, 24 be included in the bundle 26 so as not to be so bulky as to protrude through the cover layer and affect the exterior appearance of the hose.

Figure 4:
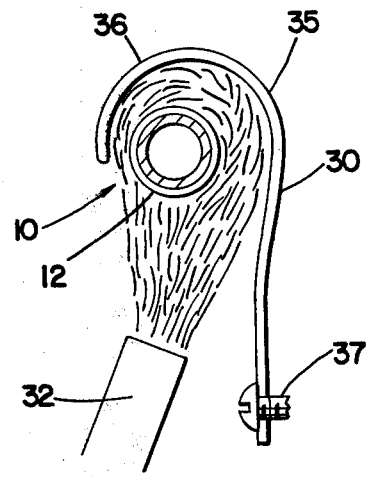
FIG. 4 is an end view of the hose carcass at the open-flame heating stage of its manufacture, depicting the apparatus for applying the flame to the hose carcass.

Referring now to FIG. 4 the heater stage 18 of the manufacturing process is depicted in more detail as comprising open flame 30 emanating from a typical natural gas or propane burner tube 32 which is played upon the reinforcement layer 12 of a hose carcass immediately prior to the extrusion of an outer cover 14 thereover by means of extruder device 19. A metal deflector 35 is positioned in the path of the flame 30 and includes a generally semi-circular portion 36 partially surrounding the hose 10. The deflector 35 is rigidly mounted by a bolt as at 37 to evenly distribute the flame 30 about the periphery of the hose 10 as the hose passes axially thereby. It should be noted that the direction of the flame 30 is generally tagential to the surface of the hose 10, in being made to flow over the periphery thereof by the deflector 35. This causes the flame 30 to be intercepted by the protruding portions of the twisted yarn bundle 26, to accentuate the heating effect at the bonding sites 25 in preference to the heat directed to the remainder of the hose structure 10. This preferential heating effect assures that only desired portions of the bonding yarns 24 are heated to near the melting temperature thereof, while not overly affecting the remainder of the hose in a possible detrimental manner.

The degree of heat applied to the structure is further controlled by the speed of transit of the hose 10 in an axial direction during the processing thereof as well as the width of the sheet of flame 30 applied to the hose. The width of flame is determined by the width of the deflector 35 as well as the size of the orifice from burner 32. Typically, the speed of manufacture, or axial movement of the hose 10 is on the order of 50-100 feet per minute and at this rate an open flame or width of deflector 35 on the order of 3-4 inches is employed to attain the desired elevation of temperature. Burner 32, is shown as orthogonally directed toward the axis of the hose 10, but may also be directed at less than a 90° angle so as to be played along the surface of the reinforcement layer 12.

Polypropylene yarn used as the bonding yarn 24 has a melting temperature about 300° F. and it is desired that the bonding yarn 24 be raised to substantially this temperature by the open flame 30. Additional heat may be obtained from extruder 19 and the outer cover 14 such that fusion of the bonding areas occur once the cover 14 is in place and has begun an outer peripheral cooldown. This assures that the remainder of the hose structure remains in place until bonding has been completed, this occuring shortly after the cover 14 has been applied. If a forced cool-down is required, occurring, for example in a short run prior to storage on the take-up reel 20, a cooling bath can be introduced as necessary.

What is claimed is:

1. A hose construction comprising a tubular core formed of a thermoplastic material for conducting fluids therethrough, reinforcement means wound about said core in intermixed first and second portions, at least one of said first and second portions comprising a yarn bundle of twisted yarns of polypropylene and reinforcement material, said first and second portions being wrapped about said core tube in a relatively evenly distributed arrangement to provide discontinuous bonding portions of polypropylene at the periphery thereof in tangency with the inner periphery of an imaginary cylindrical surface disposed thereabout, and an outer cover of olefinic material extruded over said reinforcement layer, said outer cover having an inner surface in contact with said bonding portions and being fused thereto to secure said cover against movement relative to said reinforcement layer.

2. A composite plastic hose article, comprising a core tube of plastic material for receiving and conveying fluids, said core tube being semi-rigid to provide flexibility and support for reinforcement thereon, a reinforcement layer comprising plural yarns wound over said core tube for strengthening said hose article, at least one of said yarns being of olefinic material wound relative to said other yarns to provide a substantially even distribution of discontinuous contact areas of olefinic material at the outer periphery of said reinforcement layer, said contact areas having been softened by direct exposure to open flame, and a thin tubular cover of olefinic material over said reinforcement layer and bonded thereto only at said contact areas, thereby providing a secured cover for said composite hose article, each said reinforcement yarn of olefinic yarn comprising a yarn bundle of twisted yarns, at least one of said yarns in said bundle being continuous filaments of olefinic material so as to provide a repetitive pattern of protrusions of olefinic material at the periphery of said yarn bundle for contact with said tubular cover.

3. The hose article as set forth in claim 2 wherein said olefinic reinforcement yarn comprises three strands of material, one of said strands being of olefinic material.

4. The hose article as set forth in claim 2 wherein said sheath is thermoplastic rubber.

5. The hose article as set forth in claim 2 wherein said olefinic reinforcement material is polypropylene.

* * * * *